United States Patent
Candy

(10) Patent No.: US 11,340,374 B2
(45) Date of Patent: May 24, 2022

(54) METAL DETECTOR

(71) Applicant: Minelab Electronics Pty. Limited, Mawson Lakes (AU)

(72) Inventor: Bruce Halcro Candy, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 0 days.

(21) Appl. No.: 17/012,327

(22) Filed: Sep. 4, 2020

(65) Prior Publication Data

US 2021/0072418 A1    Mar. 11, 2021

(51) Int. Cl.
*G01V 3/10*    (2006.01)
*G01V 3/165*    (2006.01)

(52) U.S. Cl.
CPC ............. *G01V 3/101* (2013.01); *G01V 3/165* (2013.01)

(58) Field of Classification Search
CPC .......... G01V 3/10; G01V 3/101; G01V 3/165; G01V 3/15; G01V 3/107; G01V 3/104; G01V 3/105; G01V 3/12
See application file for complete search history.

(56) References Cited

U.S. PATENT DOCUMENTS

| | | | |
|---|---|---|---|
| 3,662,255 A * | 5/1972 | Garrett | G01V 3/15 324/328 |
| 4,507,612 A * | 3/1985 | Payne | G01V 3/105 324/233 |
| 7,518,374 B1 | 4/2009 | Olsson et al. | |
| 7,994,789 B1 * | 8/2011 | Geyer | G01V 3/104 324/326 |
| 8,106,770 B2 | 1/2012 | Candy | |
| 8,400,154 B1 | 3/2013 | Olsson et al. | |
| 8,614,576 B2 | 12/2013 | Candy | |
| 9,348,053 B2 | 5/2016 | Candy | |
| 9,547,065 B2 | 1/2017 | Candy | |
| 9,829,598 B2 | 11/2017 | Candy | |
| 2005/0116714 A1 * | 6/2005 | Rudakov | G01R 33/3628 324/322 |
| 2010/0174348 A1 * | 7/2010 | Bulkes | A61N 1/05 607/116 |
| 2014/0097831 A1 | 4/2014 | Whaley | |
| 2016/0146857 A1 | 5/2016 | Behrends et al. | |
| 2018/0106925 A1 | 4/2018 | Candy | |
| 2018/0172869 A1 | 6/2018 | Candy | |
| 2020/0161046 A1 * | 5/2020 | Goodman | H01F 29/025 336/142 |

OTHER PUBLICATIONS

J.Breiten, EE241 Course notes, downloaded on Jul. 27, 2021, https://courseware.ee.calpoly.edu/emeritus/jbreiten/EE241/241_Narrative8_rev4.pdf.*
Dunlop et al., "Rock Magnetism, Fundamentals and Frontiers", Cambridge: Cambridge University Press, 1997, Chapter 10, Viscous and thermoviscous magnetization, pp. 262-287.

* cited by examiner

*Primary Examiner* — Jermele M Hollington
*Assistant Examiner* — Suresh K Rajaputra
(74) *Attorney, Agent, or Firm* — The Webb Law Firm

(57) ABSTRACT

A winding of an antenna of a metal detector, the winding includes multi-turn wire with both ends connected to the metal detector; and at least one resistive component for connecting a first part of the winding to a second part of the winding. The first part or the second part are not both ends of the winding. The resistive component is configured to damp an internal resonance of the winding with an order greater than 1.

19 Claims, 9 Drawing Sheets

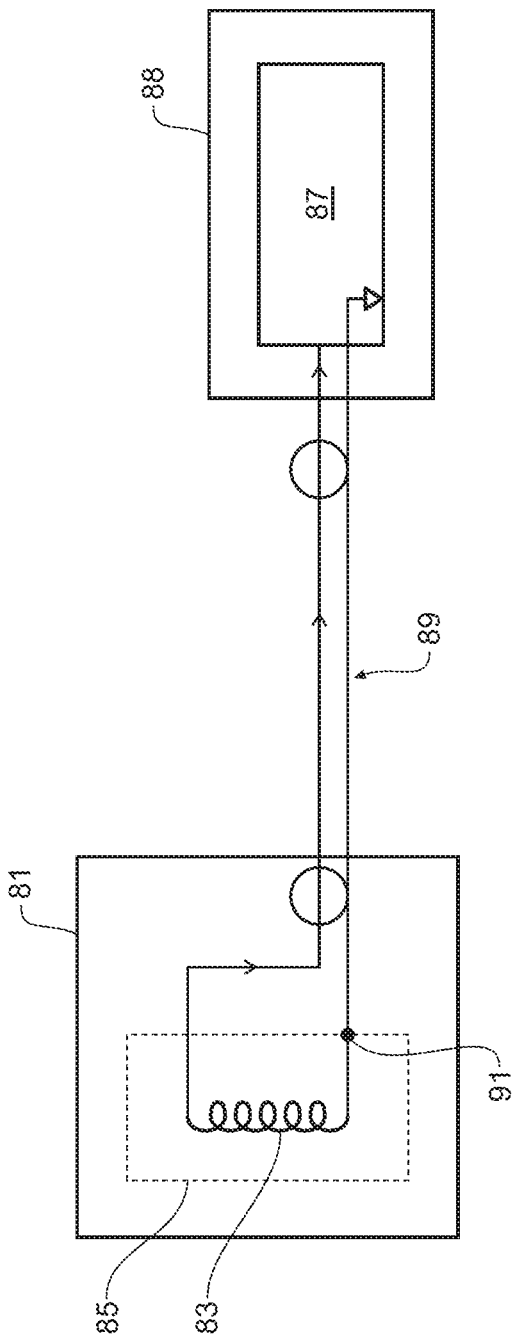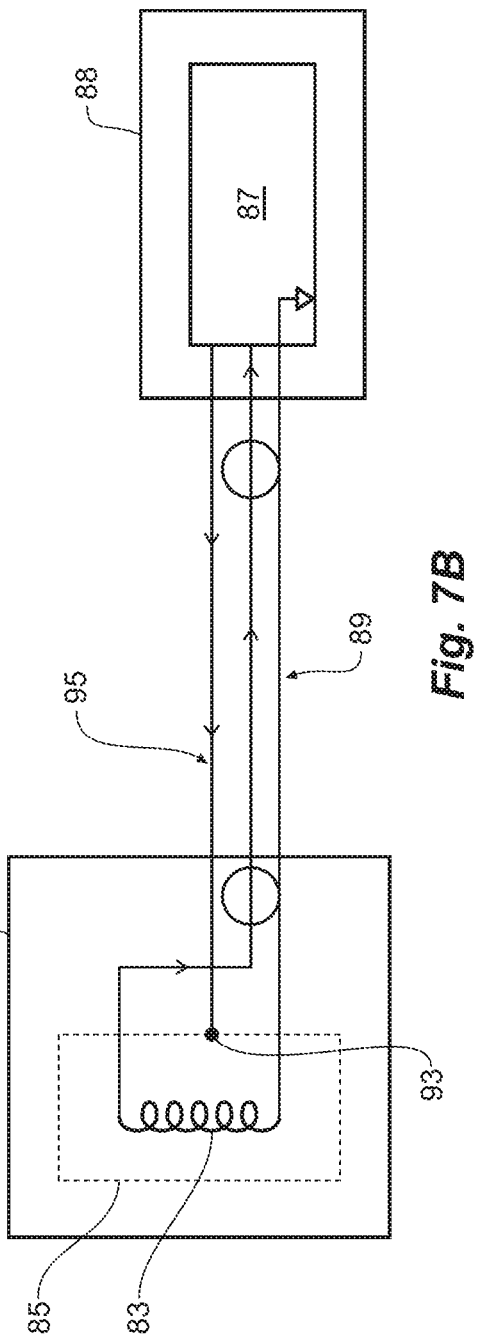
Fig. 7A (Prior Art)
Fig. 7B

METAL DETECTOR

CROSS-REFERENCE TO RELATED APPLICATION

This application claims priority to Australian Provisional Patent Application No. 2019903282 filed Sep. 5, 2019, the disclosure of which is hereby incorporated by reference in its entirety.

TECHNICAL FIELD

The present invention relates to a metal detector.

BACKGROUND

The general forms of most metal detectors which interrogate soil are either handheld battery operated units, conveyor-mounted units, or vehicle-mounted units. Examples of handheld products include detectors used to locate gold, explosive land mines or ordnance, coins and treasure. Examples of conveyor-mounted units include safety detection of metal in food production lines and detection of metal in mining ores before entering crushers, and examples of a vehicle-mounted unit include detectors to locate buried land mines.

These metal detectors usually, consist of transmit electronics generating a repeating transmitted signal cycle of a fundamental period, which is applied to an inductor, for example a transmit winding, which transmits a resulting varying magnetic field, sometimes referred to as a transmitted magnetic field.

These metal detectors also contain receive electronics that process a received signal from a receiver/antenna that measures a received magnetic field, during one or more receive periods during the repeating transmitted signal cycle. During this processing of measuring the received magnetic field, the receive signal is either sampled, or synchronously demodulated, to produce one or more signals to produce the indicator output signal, the indicator output signal at least indicating the presence of at least a metal target within the influence of the transmitted magnetic field.

SUMMARY

According to a first aspect of the present invention, there is provided a winding of an antenna of a metal detector, the winding comprises multi-turn wire with both ends connected to the metal detector; and at least one resistive component for connecting a first part of the winding to a second part of the winding, wherein the first part or the second part are not both ends of the winding; and wherein the resistive component is configured to damp an internal resonance of the winding with an order greater than 1.

In one form, the winding comprises a first winding in series with a second winding, the both ends refer to one end of the first winding connected to the metal detector, and another end of the second winding connected to the metal detector.

In one form, the resistive component comprises a resistor in series with a capacitive component or inductive component. In one form, the first part and the second part are positioned in one of the following configurations: a) the first part or the second part is at one of the both ends connected to the metal detector; with the other part not at any of the both ends; b) both the first part and second part are not at any of the both ends. In one form, a cross section of the multi-turn wire defines two ends wherein one of the two ends is at or near an outermost portion from a middle point of the antenna, and the other end is at or near an innermost portion from the middle point; and wherein a middle tap is positioned at a middle or near middle of the two ends of the winding, and the resistive component connects one of the two ends to the middle tap to reduce a Q factor of the second-order resonance. In one form, the winding further comprising a quarter tap and a three-quarter tap at approximately a quarter and three-quarter distance of the cross sectional of the multi-turn wire for connecting the first part to the second part. In one form, the resistive component is provided by a coat of conductive resistive damping material.

According to a second aspect of the present invention, there is provided an antenna of a metal detector comprising the winding of the first aspect as a first receive winding, further comprising a second receive winding, and the first receive winding and the second receive winding are connected in series, and the at least one resistive component is connected in parallel with the first receive winding or the second receive winding.

In one form, the antenna comprises the winding of the first aspect as a first transmit winding, further comprising a second transmit winding, and the first transmit winding and the second transit winding are connected in series, and the at least one resistive component is connected in parallel with the first winding or the second winding. In one form, the first transmit winding, and the second transmit winding are tightly mutually coupled with a coupling constant $k_{12}$ of at least 0.8. In one form, there is a gap between the first transmit winding, and the second transmit winding. In one form, the first winding has at least part of its cross-sectional winding profile with a first cross-sectional axis longer than a second cross-sectional axis by at least a factor of 3. In one form, the first transmit winding, the second transmit winding, or both, is a monolayer winding. In one form, $$\sum_{all\ receive\ windings} \oiint \frac{\partial \overrightarrow{B_{uniform\ field}}}{\partial t} \cdot \vec{ds} \approx 0$$

such that an aggregate transmit winding and an aggregate receive winding consisting of all the receive windings, are approximately nulled when the coil is placed away from any material other than air.

According to a third aspect of the present invention, there is provided an antenna of a metal detector comprising the winding of the first aspect as a first transmit winding, further comprising a receive winding, a first electrostatic screen and a second electrostatic screen, wherein the first electrostatic screen acts more to screen the receive winding than transmit winding and a coupling capacitance between the first electrostatic screen and the receive winding is higher than that between the first electrostatic screen and transmit winding, and, the second electrostatic screen acts more to screen the transmit winding than the receive winding, and a coupling capacitance between the second electrostatic screen and the transmit winding is higher than that between the second electrostatic screen and the receive winding, and each of the first electrostatic screen and second electrostatic screen are connected to the metal detector electronics via different conductors, a first conductor and a second conductor respectively.

In one form, the first conductor is an external screen of a coaxial cable. In one form, an inner core cable of the coaxial cable is connected to the receive winding. In one form, the winding is a winding of a receive coil of the metal detector, wherein the resistive component comprises a resistor in series with a capacitive component or inductive component for connecting a first part of the winding to a second part of the winding.

In one form, the winding is a winding of a receive coil of the metal detector nulled to a transmit coil of the metal detector; and wherein the resistive component is configured to damp high order resonances not nulled between the receive coil and the transmit coil. In one form, the resistive component is further configured to damp high order resonances within the receive coil itself, concurrently with the damping of the high order resonances not nulled between the receive coil and the transmit coil.

BRIEF DESCRIPTION OF DRAWINGS

Embodiments of the present invention will be discussed with reference to the accompanying drawings wherein:

FIGS. 7A and 7B depict examples comparing the connections of an antenna with an grounded electrostatic screen with the connections of an antenna with an active electrostatic screen based on the one embodiment of the present disclosure;

DESCRIPTION OF EMBODIMENTS

Figure 1:
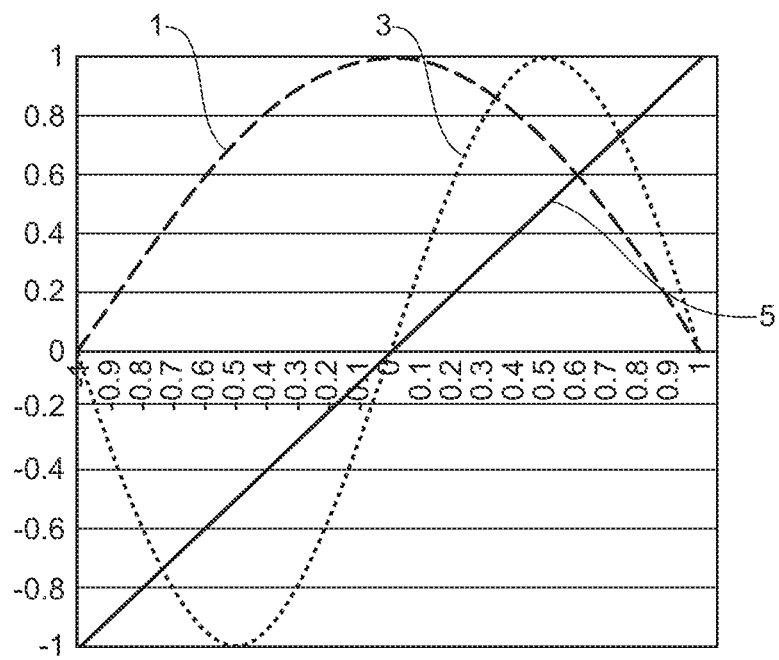
FIG. 1 depicts a cross-section of individual windings of a monolayer antenna to explain an issue of some existing metal detectors.

In this specification, new electronics for a metal detector is presented. This applies to mainly time-domain metal detectors, such as for example, for a metal detector where its transmitted waveform is pulse induction (PI), or, PI-like waveforms, and wherein the mode of operation may include both separate transmit and receive periods or simultaneous transmit and receive periods. For ease of explanation, the specification describes that of a PI metal detector as an example, but it does not mean that the embodiments described herein can only be used with a PI metal detector. It applies generally to all time-domain detectors, but also to frequency domain detectors.

In this specification, unless otherwise stated, a metal detector antenna typically comprises at least one winding of a multiple-turn conductor, such as single strand copper wire, and/or Litz wire. Within the metal detector industry of hand-held and vehicle-towed metal detectors, the magnetic antennas are known as "coils", and almost all consist of inductive coiled windings that act to transmit magnetic fields and receive time-changing magnetic fields, and these windings are housed within typically a plastic coil housing. The magnetic field transmitter and the magnetic field receiver may be the same entity, for example they may be provided by a dual-purpose so called "monoloop" coil winding. Hand-held metal detector commercial coils almost always either have circular or elliptically shaped planar coil housings that are wide and long compared to their height. Normally, the hand-held coil is swept side-to-side with the planar coil housing constrained to be parallel to the soil surface and with a bottom plane of the coil housing just above the soil surface when buried targets are being sought by an operator, with the operator advancing slowly forward, usually ensuring that coil housing at least passes over all the soil being interrogated along the "pathway" being defined by the swept width of the gradual forward passage of the operator. The windings are invariably surrounded by an electrostatic (ES) screen within the coil housing, with the ES screen usually connected at a "ground" reference potential of the detector electronics. This acts as to screen out external electromagnetic interference (EMI) electric fields capacitively coupling into the receiver, and also variations in capacitive coupling between the soil permittivity and transmit electromotive force (emf) and magnetic field receiver as the coil is swept over the soil.

Magnetic soils contain super-paramagnetic viscous remnant magnetic particles (called VRM) that are highly relevant to metal detectors, namely, single crystal ferrite particles with dimensions about the 30 nm range. Each particle has an associated time-constant that is temperature dependent. Basically, this time-constant is defined by how frequently the direction of the magnetism of the particle spontaneously randomly changes direction in the absence of an external magnetic field. (See for example David J Dunlop and Ozden Ozdemir (1997). *Rock Magnetism, Fundamentals and Frontiers*. Cambridge: Cambridge University Press, Online ISBN: 9780511612794) The received signals from these VRM super-paramagnetic particles are a function of the history of the applied varying transmitted magnetic field, and are thus associated with energy loss, and are sometimes referred to as the "R" component. There are other more abundant non-VRM magnetic components consisting of larger single domain crystals and multidomain, and yet further, effectively non-VRM components from a metal detector point of view, that are actually VRM components, but have time constants well outside of the bandwidth of the metal detector receive electronics. These said non-VRM magnetic soil components (plus relatively very short or very long time constant VRM components) respond directly, effectively instantaneously, to the metal detector's transmitted applied magnetic field, rather than being a function of the history of the applied field, and therefore most of these particles are associated with energy conservation, and are sometimes referred to as the X component. The said non-VRM magnetic soil components, plus relatively very short or very long time constant VRM components, together have a relative magnetic permeability of typically roughly two orders of magnitude greater than the effective VRM components with time constants within the effective bandwidth of the metal detector. Received signals from these magnetic soil particles responding to the transmit field are relatively massive compared to the weakest detectable metal target eddy current induced signals, and thus the received soil signals need to be cancelled out, whilst not cancelling out the metal target signals, in order to detect these said weakest detectable metal target signals. This technique of cancelling out magnetic soil signals is known as "ground balancing" in the industry. On average, soils exhibit approximately log-uniform time-constant VRM distributions in the time-constant range relevant to hand held metal detectors, but with a slight somewhat spatially random log-linear component. (See for example U.S. Pat. No. 8,106,770.)

Most commercial metal detector coil windings are of a compact cross-sectional winding shape (viewed at right-angles to the direction of the conductors), typically circular or rectangular or square in cross-sectional shape. However, some coils of metal detectors designed are fit for purpose to find gold in gold fields, have windings that are not compact in cross-sectional shape, but arranged in monolayer planar spirals with each of the adjacent turns usually touching one another. Coils incorporating spiral planar monolayer windings are usually known as "flat-wound" coils in the industry, but such windings are known scientifically as Archimedean spiral windings.

There are various well-known types of nulled coils, for example the so called "DD", "DOD" and concentric types. Nulled coils have a receive winding arrangement such that $$\sum_{all\ receive\ windings} \oiint \frac{\partial \overrightarrow{B_{Tx}}}{\partial t} \cdot d\vec{s} \approx 0,$$

that is, the emf induced from the net integrated rate of change of transmitted magnetic field encompassed through the aggregate receive windings approximately equals zero, in other words, the net mutual coupling coefficient "k" between the aggregate transmit windings, and aggregate receive windings is $k_{TR} \ll 1$, and in commercial coils, certainly $k_{TR} < 0.03$, and typically closer of the order of 0.1% (in the absence of any significant nearby permeable or conductive material). This may be achieved by having a partial overlap between a single transmit winding and a single receive winding, as is the case with the well-known DD. Alternatively so called "concentric coils" employ a plurality of receive windings in series, and/or, a plurality of transmit windings in series, such that the aggregate induced emf in all the receive windings from all the transmit winding fields is approximately zero. This invention relates to both nulled windings, and dual-purpose (monoloop) windings wherein the latter said windings act as both transmitters and receivers. Commercial metal detector coils house windings typically near coplanar as is the case for most concentric coils, and mono-loop coils, or near to being coplanar, as is the case with DD coils or DOD coils, and the windings are all relatively close and near parallel to a bottom plane of the coil housing, that is, the "2-D" windings are designed to couple well into the surface soils when the bottom plane of the coil housing is near the soil surface when searching for buried metal targets.

The capability of a metal detector fit for purpose for finding metal targets at maximum buried detection depth for a given target (big and small), is loosely defined by the target-signal-to-uncancelled-soil-noise-signal ratio. Non-ideal electronic properties of the coil can play an important role in the generation of spurious signals due to the coil's winding's interactions with soil magnetics that may degrade metal target-signal-to-uncancelled-soil-noise-signal ratio. This is especially true when the transmit signal includes high slew-rate (high rate of change) transient voltage signals. This problem is addressed in this invention. Some examples of such high slew-rate transmit signals are disclosed in US2018106925, U.S. Pat. Nos. 9,348,053, 8,614,576, and 9,829,598.

Not all metal detector antennas can be said to include a "cable connected to the winding", for example, in some industrial conveyor mounted metal detectors, the winding may be in effect connected directly to a PCB. However, in this specification, it is assumed that the winding or windings are connected to a "cable", but this does not limit this invention to require the said cable.

In this specification, unless otherwise stated, a receive winding or windings of a metal detector can be separate from a transmitter winding or windings, or the receive winding or windings and the transmitter winding or windings can be the same single winding or windings.

Time-domain metal detectors usually synchronously demodulate (or sample) a receive signal from a receive antenna winding commencing after a short delay following a voltage transition of a transmitted signal, for example, after a high slew-rate switching from a high voltage (e.g. 200V) to a low-voltage (e.g. 2V) or to zero voltage. In most detectors, the minimum for the practical delay is usually limited by the time-decay signal from a critically damped receive winding, wherein the capacitance of any cable or other capacitive loading on the receive winding circuit, such as the screen or the electronics, contributes to the said decay. For example, in a PI detector, wherein the receive and transmit winding are one and the same (a so-called "monoloop" winding), the voltage across the winding needs to decay from hundreds of volts down to millivolts to avoid overloading a receive electronics preamplifier connected to it, and thereafter, still continues to decay for some time. Further, this decay-time is altered by the magnetic permeability of interrogated soils due to the effect of altering the inductance of the said antenna inductive winding. If the receive signal synchronous demodulation commences during this decay time period, which as said, may vary when magnetic soils are being interrogated, this will cause corresponding varying undesirable spurious signals. However, there is a conflicting requirement for many metal detectors that are used to seek short time-constant metal targets, namely, these require as early as possible commencement of receive synchronous demodulation, or sampling, post the said voltage transition of a transmitted signal. This is because much of the decaying signal from the faster time-constant targets following a transition of the transmitted signal are by definition, ephemeral, and thus most, or even practically all of this target signal decay is not added into the receive demodulation, and hence contribute relatively poorly to the indicator outputs signal. Examples of short time-constant targets include some minimum metal land mines, small gold nuggets, and fine jewelry. Improving the sensitivity to very short time-constant targets requires reduction of this delay before demodulation, in turn thus requiring reduction of the time-decay of the critically damped receive winding.

A problem with a coil winding is electrical resonances due to inductances, inter-winding capacitances, and inter-winding mutual inductances. These must be thought of as being distributed and not lumped single elements. Indeed even a winding's "fundamental self-resonance" cannot be modelled as a single effective inductance "L" in parallel with a single effective capacitance "C", because (in practice) the two calculations of effective parallel capacitance determined via a measurement of the measured resonant frequency $\omega_{LC}$ of $$C_{resonant} = \frac{1}{L(\omega_{LC})^2},$$

versus that implied by critical damping $$C_{critical\,damp} = \frac{L}{(2R)^2}$$

where R is the parallel resistance required for critical damping, are typically significantly different, especially, for example, uniformly spiraled monolayer windings. This assumes the value of L is measured at frequencies much less than $\omega_{LC}$. Further, the distributed capacitances, inductances and mutual inductances, result in higher-order resonances other than the first-order resonance, namely, the "fundamental self-resonance". As best understood, there is not much research in the area of higher-order internal resonances of inductive windings, because usually these internal resonances are irrelevant to almost all inductor applications, e.g. switch mode power supplies, and hence, the lack of any need for research in this area. It was discovered that these higher-order internal resonances are caused by inter-winding distributed capacitance and mutual inductance. These resonances are typically about an order of magnitude higher in frequency than the very well-known fundamental "self-resonance" for monolayer winding profiles that include the capacitance of a coaxial cable coil cable connecting the winding to the metal detector electronics, but not necessarily so for glued and/or self-bonded bunched windings, which may be somewhat less than an order of magnitude higher. For example, the fundamental self-resonance of a tightly-wound Archimedean spiral winding of about 40 cm diameter and 300 μH, with a copper Litz winding cable of total copper diameter 1.95 mm, with each conductor spaced apart by 2.25 mm centre to centre, with relatively low dielectric permittivity material in between connected to a typical hand-held metal detector antenna cable, may be roughly about 600 kHz, whereas the winding produces a second-order resonance in the region of 5 MHz, and a third-order in the region of 9 MHz. Further, until this disclosure, there is no in-depth research of higher order internal resonances of antenna windings in the field of metal detectors, including sinewave and traditional PI transmitting metal detectors. However, these internal resonances are now discovered to be problematic because the second order or higher resonances decaying ringing "phases" and frequencies following a high slew-rate transmit voltage transition just before receive synchronous demodulation commences, are modulated by both changes in environmental magnetic permeability and electrical permittivity near to the coil (usually operationally due to soils moving beneath the coil), which may in turn adversely alter demodulated and processed receive signals. In practice the order higher than third may be attenuated to be negligible in effect through metal detector preamplifier low-pass filtering. Thus, it is desirable to damp at least the second order and preferably third order resonance.

A basic summary of these internal resonances is disclosed herein for reference, because it is not known to those skilled in the art of metal detection. The models used for this are simplified sufficiently for purposes of understanding.

FIG. 1 shows a normalised graph of voltage profiles across a cross-section width of a uniformly wound monolayer winding (such as an Archimedean spiral), spanning from "x=−1" at one end of the winding, to "x=+1" at the other end of the winding, for the potentially problematic second and third order resonances, due to the distributed components within the winding. As shown in FIG. 1, across the cross-section width of a uniformly wound monolayer winding, the potentially problematic second-order, 1 of FIG. 1, voltage profile approximately follows $$\cos\left(\frac{x\pi}{2}\right),$$

and for the third order, 3 of FIG. 1, sin π(x), both normalised from x=−1 to x=+1 across the cross-section, and both with positive peaks normalised to +1. For reference, the fundamental self-resonance 5 is depicted as being linear across the cross-sectional width, although, this too is an approximation, because of greater self-inductance contribution per turn at the central part of the said monolayer winding compared to the turns nearer the edges.

The majority of metal detectors with high sensitivity such as those used to interrogate buried targets in soils, or food safety conveyor mounted metal detectors, use an electrostatic screen to surround one or more receive windings of the antenna. This screen is a relatively poor conductive material connected to electrical ground of a system. In some instances, for example, this material may be "aquadag", and in others, conductive plastic. The interaction between the windings and these electrostatic screens adds mainly capacitance, usually slightly lossy, to the equivalent fundamental resonant circuit LCR network of the windings.

An aim of this disclosure is to improve the speed of decay transients resulting from transmit winding voltage transitions by connecting the electrostatic screen to a processed receive signal, such that in effect, a signal on the screen partially "bootstraps" a signal of the receive winding to reduce the effective capacitance presented by the electrostatic screen to the said receive winding.

In one embodiment, the electrostatic screen is connected to the receive electronics to receive signals from the receive electronics to reduce an effective capacitance presented by the electrostatic screen to the receive winding.

Figure 2:
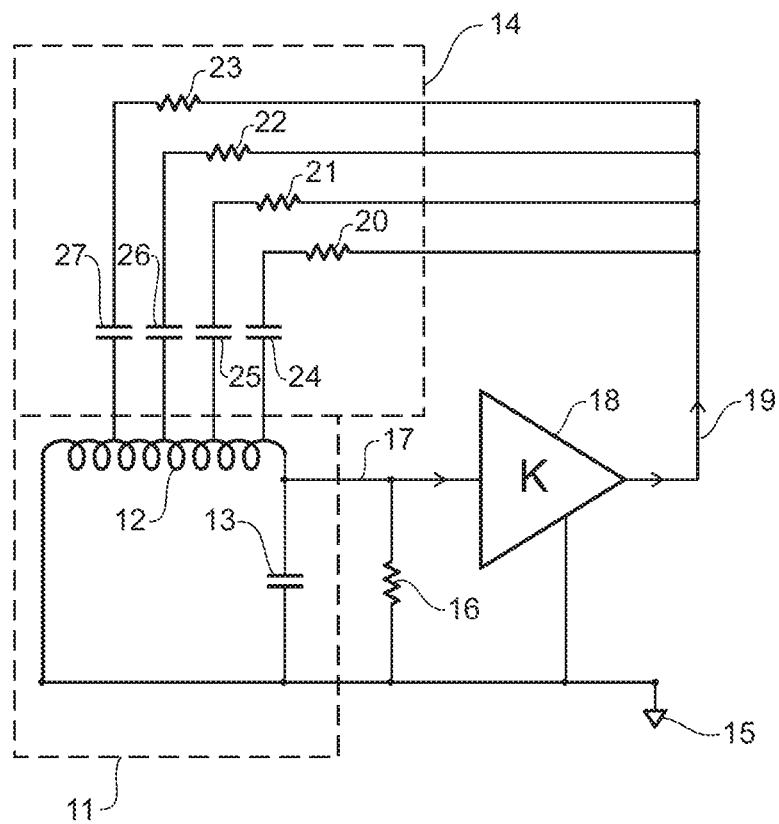
FIG. 2 depicts a circuit for the purpose of aiding understanding of the invention.

FIG. 2 illustrates the distributed capacitive coupling nature of the electrostatic screen to a winding. This circuit shows that the electrostatic screen 14 consists of a distributed lossy capacitance between it and the winding 12 of a receive winding 11 of a metal detector. The lossy distributed capacitance of the electrostatic screen 14 is represented by capacitors 24, 25, 26 and 27, with loss from respective series connected resistors 20, 21, 22 and 23. The equivalent self-capacitance of winding 12 associated with its fundamental self-resonance is simply shown in this example as a single capacitor 13 rather than a distributed capacitance. The associated fundamental self-resonance capacitance 13 includes any antenna cable connected between the winding 12 and the electronics, and any other associated stray capacitance such as that from an electronics printed circuit board (PCB) and input of receive electronics. The winding 12 is connected to a damping resistor 16, and also to an input 17 of part of the receive electronics, an input of amplifier 18 with gain K. Amplifier 18 in one example has a high input impedance. An output 19 of amplifier 18 is connected back to the electrostatic screen 14. Hence, the system has an "active electrostatic screen" as opposed to the traditional "passive" screens. The system ground is indicated by 15.

Figure 3:
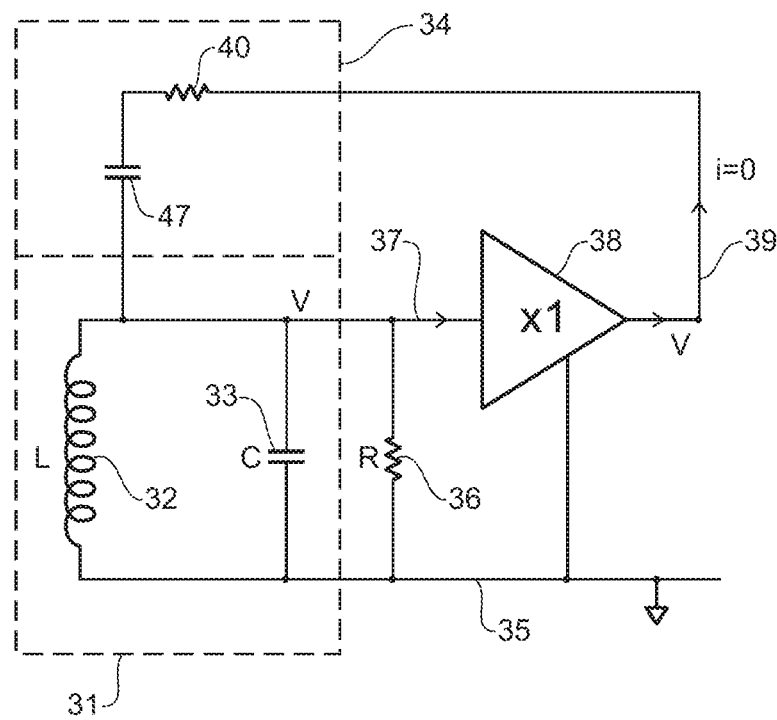
FIG. 3 depicts a simplified circuit of FIG. 2.

A simplified version of FIG. 2 is shown in FIG. 3 for the purpose of aiding understanding. For this, the gain of amplifier 38 is set to 1, and the screen capacitance is simplified to an approximate effective single capacitor 47 in series with an effective single resistor 40 instead of the distributed network shown in FIG. 2. The electrostatic screen is thus represented by 34. In FIG. 3, the antenna receive winding inductor 32 with associated self-resonance capacitor 33 (plus coaxial cable and electronics input), is connected to a damping resistor 36, and these are connected to an input 37 of amplifier 38, whose output 39 is connected back to the electrostatic screen 34. The system ground is indicated by 35. One skilled in the art will appreciate that with an amplifier 38 gain of 1, with the assumption of zero phase shift, or relatively small phase shift, the screen 34 will be in effect "invisible" to the receive antenna "self-resonant capacitance" because the voltage across capacitor 47 in series with resistor 40 will be zero, independent of any voltage across the receive winding. Thus, the capacitance, between the antenna receive winding 32 and electrostatic screen 34, acts as though it is absent. Therefore, the characteristic decay time of a critically damped LCR receive winding will be faster than the traditional arrangement when the electrostatic screen 34 is connected to the system ground wherein it adds to the capacitance of the said antenna receive winding 32. This advantage not only applies both to time-domain, but also frequency-domain metal detectors because of the reduced receive winding phase shifts resulting from a lower loading capacitance due to an active screen thus described.

This arrangement improves characteristic decay time $\tau = \sqrt{LC}$ to a transient in a receive winding, of the form $$v = ae^{-t/\tau} + b\frac{t}{\tau}e^{-t/\tau}$$

where a and b depend on the initial conditions at the transient of voltage across the winding and current flowing through the inductor, where $$R = 0.5\sqrt{\frac{L}{C}}$$

for a critically damped LCR system; L is the inductance of the receive winding 12 in FIG. 2 and receive winding 32 in FIG. 3; C is the associated self-resonance capacitor plus a capacitance 13 of a coaxial cable to connect the winding to the metal detector's electronics in FIG. 2. This said capacitance is depicted as capacitor 33 in FIG. 3; R is the damping resistor 16 in FIGS. 2 and 36 in FIG. 3. The above mathematics only applies to frequencies close to the fundamental resonance or lower, but not higher frequencies.

This embodiment may accentuate the higher-order internal resonances due to the resulting wider receive winding bandwidth in certain windings, which as said above, can be problematic when interrogating magnetic soils. Ideally, these said troublesome higher-order internal resonant ringing signals need be reduced, such as by lowering their associated Q factors. These higher-order internal resonances are mostly manifested in windings with cross-sections of high width-to-height (or vice versa; high height-to-width) ratios, such as mono-layer windings.

Figure 4:
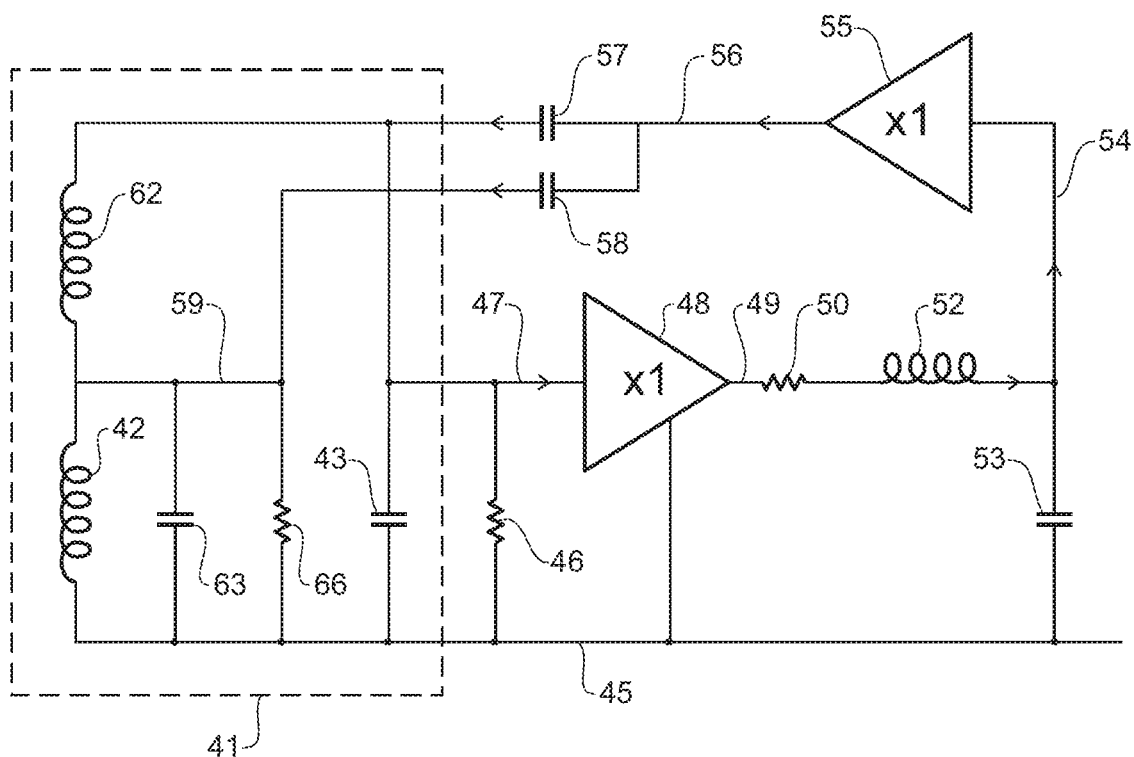
FIG. 4 depicts a simplified basic model to describe the actions of lowering the Q factor of the second order internal resonance, and discloses an exemplary circuit embodiment.

FIG. 4 illustrates an approximate simplified model of the second-order internal resonance of one embodiment to address this issue. The model is by no means particularly accurate, but sufficient for basic understanding of the salient issues. The receive winding 41 is a simple model approximation that includes the fundamental resonance and is sufficient to reasonably well produce the basic effect of the second-order internal resonance. The winding inductance is represented as split between inductor 42 of value H and inductor 62 of value L, and the self-resonance capacitance split between capacitor 43 of value D and capacitor 63 of value C. The capacitance of capacitor 43 is mostly due to the said coaxial cable that is used to connect the winding to the metal detector electronics. Resistor 66 of value R represents a lossy component of the second order internal resonance. The impedance of this network of the antenna receive winding 41 may be calculated using the following:

$$Z = \frac{\omega^2 LH - j\omega R(L+H-\omega^2 LHC)}{\omega^2 R[HC(\omega^2 LD-1)-(L+H)D]+R+j\omega H(1-\omega^2 LD)}$$

Note that this does not include the effects of the screen, nor that of the damping resistor 46.

As an example, for values of say L=50 µH, H=240 µH, C=35 pF, D=145 pF, R=10 kΩ, the self-resonance is approximately 700 kHz, and second order internal resonance is approximately 4.35 MHz. Note that the Q factor of the second-order resonance is >>1. Resistor 46 not only acts to critically damp the fundamental "self-resonance" at about 700 kHz, but also reduces the Q-factor of the second-order internal resonance slightly.

This network of the receive winding 41 is connected to an input 47 of an amplifier 48 of gain 1 (for illustrative purpose only, and the gain can take other values). An output 49 of amplifier 48 is connected to an "LCR" network consisting of resistor 50 of resistance R', inductor 52 of inductance L', and capacitor 53 of capacitor C', and the node connecting inductor 52 and capacitor 53 is connected to an input 54 of a buffer amplifier 55 (of gain 1 in this example). The network of resistor 50, inductor 52, and capacitor 53 acts as a low-pass filter, and its critically damped transfer function in the frequency domain is $$\frac{1-(\omega/\Omega)^2 - 2j\omega/\Omega}{\left(1-(\omega/\Omega)^2\right)^2 + (2\omega/\Omega)^2}$$

where the "resonance"

$$\Omega = \frac{1}{\sqrt{L'C'}}.$$

An output 56 of buffer amplifier 55 is connected to the antenna electrostatic screen represented simplistically by a single capacitor 57 and fed back to the receive winding 41. Amplifier 48, the filter consisting of resistor 50, capacitor 53 and inductor 52, and buffer amplifier 55, are part of the "receive electronics". If $$\Omega \gg \frac{1}{\tau},$$

the situation is the same as FIG. 3 at the self-resonance frequency or lower, albeit with a small amount of phase shift through the network of resistor 50, inductor 52 and capacitor 53. Accordingly, the associated capacitance added to the self-resonance capacitor 43 by a passive screen connected to the system ground 45 in the traditional art, is in effect mostly removed herein.

When considering what happens at the second-order resonance (for example, for a monolayer winding), with the second-order internal resonance ϑ being roughly $$\vartheta \sim \frac{10}{\tau},$$

the feedback signal to the screen is effectively via the high impedance node in the central part of the winding. This is modelled at node 59 in the approximate network model of the antenna receive winding 41. Thus, rather than modelling the screen as capacitor 57, capacitor 58 of value B is a more apt model for the second-order internal resonance. If resistor 46 has a value of P Ohms, then the transfer function between node 56, via capacitor 58, to the input of amplifier 48 (node 47) is $$\frac{RP\omega^2 HB}{RP(1-\omega^2 LD)[\omega^2 H(B+C)-1]+\omega^2 H(L+RPD)+j\{R\omega L(\omega^2 HC-1)+\omega H[R\omega^2 LB-P(1-\omega^2 LD)-R]\}}$$

At approximately its maximum forward gain at the second order internal resonance, the load impedance presented to capacitor 58 at node 59 is approximately resistive, and hence, at this corresponding frequency, in effect the second-order internal resonant frequency ϑ, the phase shift through capacitor 58 is approximately 90 degrees (j). Assuming that damping resistor 46 has an impedance much larger than that of capacitor 43 at ϑ, and $$\frac{1}{\omega D} < \omega L,$$

then the phase shift between node 59 and node 47 is approximately 180 degrees. Now, if Ω~ϑ, then at ω=Ω, the phase shift through network resistor 50, inductor 52, and capacitor 53 is 90 degrees lag (−j).

Figure 5:
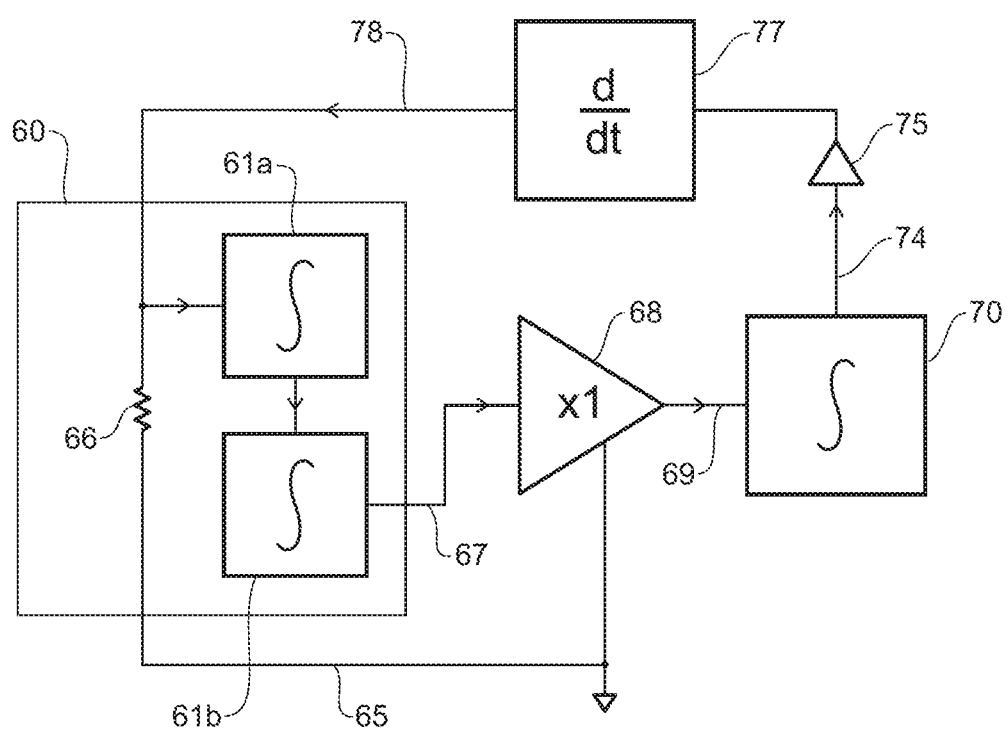
FIG. 5 illustrates one example regardless of magnitudes, the approximate phase delays around the active loop of FIG. 4, to illustrate the effect of an active screen.

FIG. 5 illustrates regardless of magnitudes, the approximate phase delays around the active screen loop of FIG. 4 at ω=Ω=ϑ. Assume that the amplifier 68 has near zero phase shift. The output 69 of amplifier 68 (equal to the role of amplifier 48 in FIG. 4) is fed to an "integrator" 70 (viz the role of resistor 50, inductor 52, and capacitor 53 in FIG. 4) to produce output at 74 to feed buffer amplifier 75 (also with near zero phase shift). The output of buffer amplifier 75 is fed to a "differentiator" 77 (viz the role of capacitor 58 in FIG. 4), which is presented at node 78 with a resistive load 66 in the model of the receive winding 60 for the second-order internal resonance. Node 78 is fed through two "integrators" 61a, 61b (viz the roles of inductor 62 and capacitor 43 in FIG. 4), thus approximately inverting the sign of a signal at node 78 at ω=Ω=ϑ. The output 67 is fed into an input of amplifier 68. System ground is shown as 65. Thus, overall, at ω=Ω=ϑ, the active screen loop acts as a negative feedback loop due to the net inverted sign around the open loop, and this is why the Q factor of the second-order resonance is reduced when this loop is closed. Note that the filter of resistor 50, inductor 52 and capacitor 53 is at least of second-order in order to achieve approximately 90 degree phase shift through it without excessive attenuation as would be the case for a first-order filter. At frequencies ω above ϑ, the advantage of selecting a low-pass filter (rather than an all-pass filter with phase shift for example), is that the low-pass filter will not cause significant interaction with yet higher-order internal resonances, nor other possible unwanted higher frequency problems. The second order low pass "LCR" filter consisting of resistor 50, inductor 52 and capacitor 53, may be implemented in various ways, for example, as an active opamp low pass filter, such as for example, the said buffer amplifier 75 acting as a VCVS low pass filter with an equivalent transfer function as that of the "LCR" network (50, 52, 53) and buffer amplifier 55 as drawn in FIG. 4.

Note that the circuits in the figures above may be implemented digitally using Analogue-Digital and Digital-Analogue convertors and processing, indeed, with additional advantages. For example, an algorithm could determine the frequency of internal resonant ringing and adjust the said forward transfer function, in either values and/or form, to optimise, that is minimise, internal resonant winding ringing Q factor and/or decay of the fundamental transient decay (such as τ described above).

Figure 6:
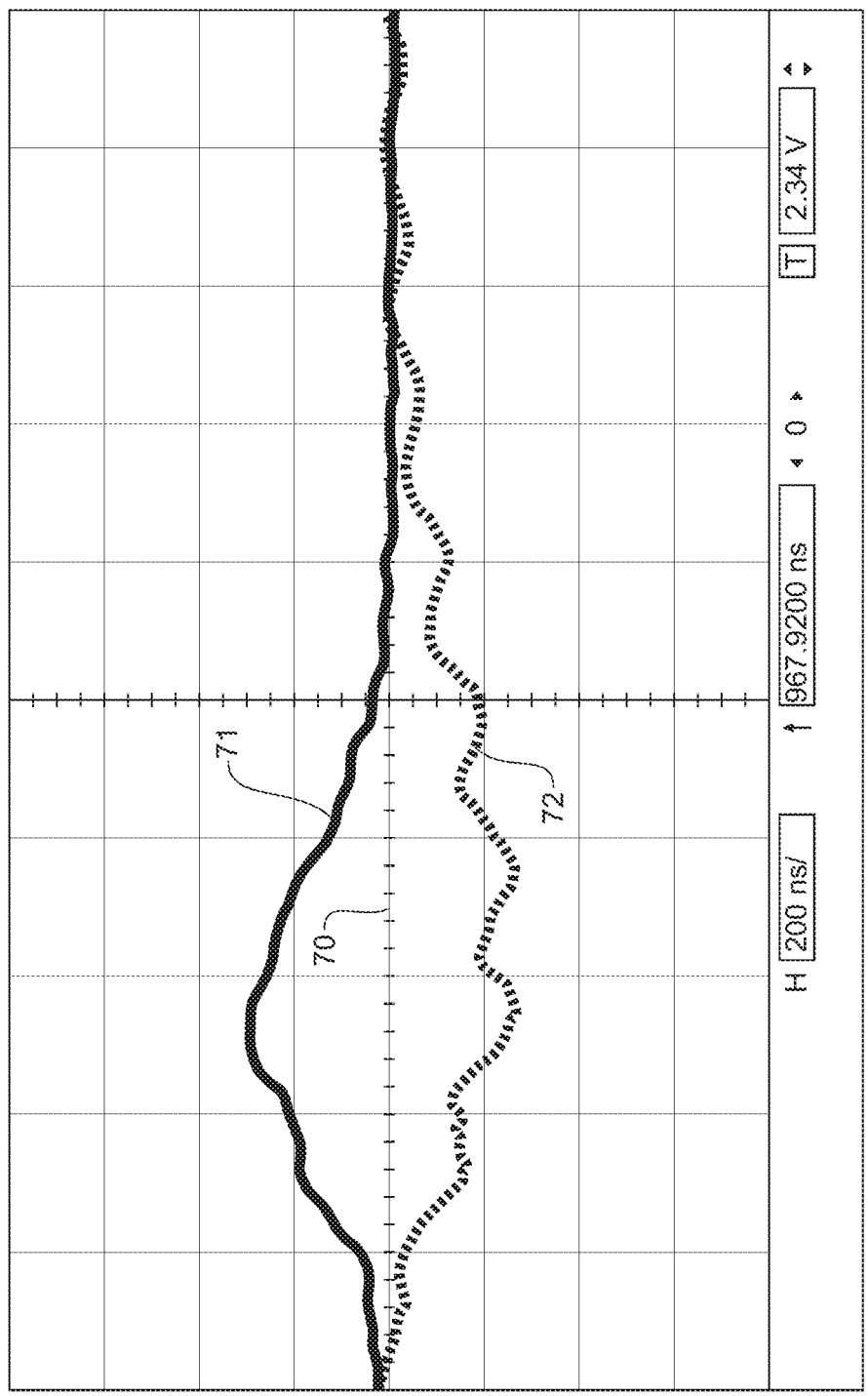
FIG. 6 shows a sketch of an observed oscilloscope trace for an active electrostatic screen system such as that of FIG. 4.

FIG. 6 shows a sketch of an observed oscilloscope trace for an active electrostatic screen system similar to that of FIG. 4, compared to when the screen is connected traditionally to a system ground. This is for when a 50 Ohm source square-wave is fed via the damping resistor to a monolayer winding, and adjusted for critical damping in both cases, and the trace shows the difference in signal following a square-wave transition for each said case between the antenna winding being unloaded, and the winding being loaded with magnetic permeability to simulate an antenna interrogating air as opposed to a magnetic soil (ignoring viscous remnant magnetic permeability). As can be seen, the spurious signal 71 from the active screen setup decays to zero substantially faster than for the conventional screen setup 72, with the Q of the internal resonance at a little over 4 MHz being very substantially reduced. The traces are drawn in opposite polarity purely for reasons of visual convenience. The zero voltage is shown as 70. The total x-axis shown in the Figure is 2 microseconds. Note that the ringing and decay of the active electrostatic screen has died down to close to zero by 1.4 microseconds, whereas the ringing of the grounded screen setup clearly continues for some time past 2 microseconds, and the decay trend ignoring the ringing (that of the fundamental decay) is significantly faster for the active screen compared to the passive screen.

Note that this feedback loop may be used just to damp down the second (or higher) order internal ringing, by applying other passive elements rather than a screen (such as a capacitor) between an output of a receive winding amplifier and the mid-point of a receive winding. Further, the same concepts could be applied to a transmit winding to likewise reduce transmit winding internal resonant ringing. The same could extend to the third-order internal resonances wherein the taps on the winding would be at about ¼ and ¾ way through the windings, but their feedback signs would be opposite respectively.

FIGS. 7A and 7B depict examples comparing the connections of an existing antenna with an electrostatic screen with the connections of an antenna with an electrostatic screen based on the one embodiment of the present disclosure. In particular, for a prior art arrangement in FIG. 7A, an antenna 81 is connected to receive electronics 87 in a control box 88 through a cable 89. Cable 89 may be a co-axial cable. Within the antenna 81, there are windings 83 surrounded by an electrostatic screen 85. The screen 85 is connected to ground at 91. In one form, the electrostatic screen 85 is connected at 93 to a cable 95 to receive a signal from the receive electronics 87. A cable including both the coaxial cable 89 and active screen cable 95 between the antenna 81 and receive electronics 87 may be a multi-core cable, and may include a coaxial cable.

Figure 8:
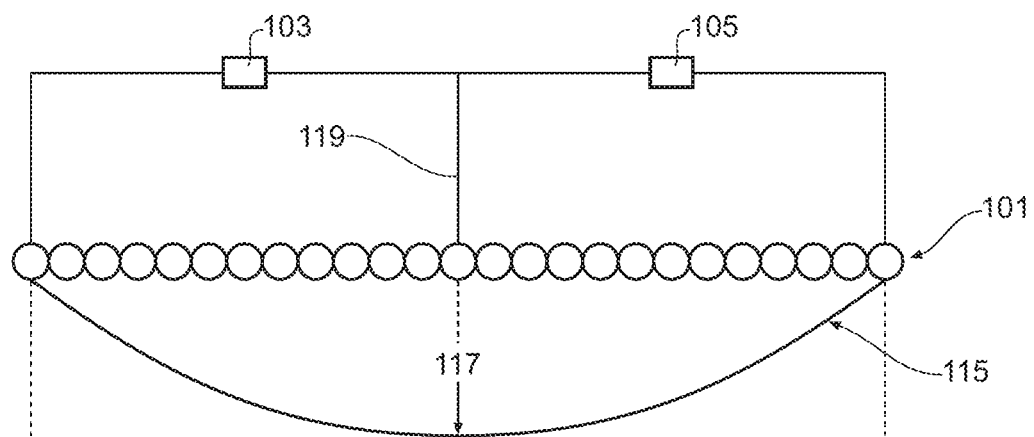
FIGS. 8 and 9 depict a cross-section of a winding configuration to reduce second and third-order internal ringing, with or without an electrostatic screen.
Figure 9:
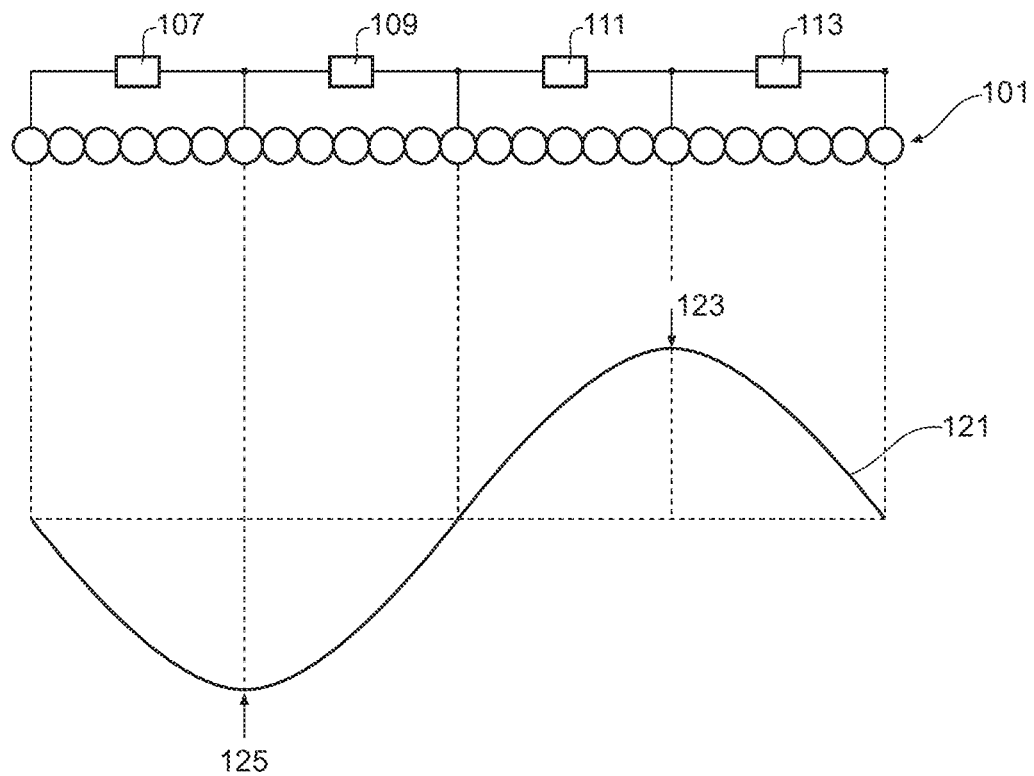

FIGS. 8 and 9 depict a cross-section of a winding configuration and/or, a group of windings connected in series that are mutually tightly coupled, to reduce second and third-order internal ringing, with or without an electrostatic screen. A cross-section of a monolayer winding 101 of an antenna comprising multi-turns is shown. Each circle represents a cross-section of a wire of the winding 101. The wires are wound perpendicular to "the page" and the innermost and outermost portions (or right most and left most) define two ends. However, this monolayer may include a gap in the middle, or, may be arranged as two parallel monolayers adjacent each other, with a gap between each monolayer. So long as the two windings are reasonably tightly mutually coupled, the windings act approximately as a single winding in terms of the fundamental and higher-order resonances. In one form, a passive network including a resistive component 103 connects one end of the winding 101 (in this case the wire at the left most) to a centre or near centre wire 119. In another form, a passive network including a resistive component 105 connects another end of the winding 101 (in this case the wire at the right most) to a centre or near centre wire 119. In terms of the model of FIG. 4, this can be modelled as reducing equivalent resistor 66 (but may include extra passive components too). Alternatively, a passive network including resistive components 107, 109, 111, and 113 are used to connect different parts of the winding 101. Graph 115 shows the (internal) resonance voltage of the second-order with 117 indicating the maximum voltage at or near the centre of the winding 101 while graph 121 shows the (internal) resonance voltage of the third-order with 123, 125 indicating the maximum voltage points at or near the quarter and three-quarter point of the winding. The third-order internal resonance may be passively damped, for example, by connecting a passive network, including, a resistive component 107 to one end of the winding 101 and a tap at about one quarter way along the winding 101, and another passive network including a resistive component 113 to the other one end of the winding 101 and a tap at about three quarters way along the winding 101. Both the second and the third-order internal resonances may be passively damped for example, by connecting a passive network including a resistive component 107 and 113 as described above, and also a passive network including a resistive component 109 to a tap about one quarter way along the winding 101 to a tap about half way along the winding 101, and a passive network including a resistive component 111 to a tap about half way along the winding 101 to a tap about three quarters way along the winding 101.

Thus passive damping networks shown as 103 and 105 damp the second-order resonance as described above, and 107, or 109, and 113 or 111, damp the third-order, or, 107, 109, 111 and 113, or, 107 or 109, and 113 or 111, plus 103 or 105 or both, to damp both the second and third-order simultaneously. Each passive damping network may include, for example, a resistor in series with a capacitor of relatively low value so that the power dissipated across the resistor during any transmit high voltage periods (e.g. 200V) is low, but with the capacitor's value set so that at the n-th winding resonance to be damped, the impedance of the capacitor is $$\frac{-j}{\omega_n C} \sim R,$$

where R and C are the values of the selected resistors and capacitors respectively, and $\omega_n$ the resonant frequency of the n-th order resonance to be damped. For the transmit coil example above, the series capacitors may for example be 12 pF or more, and the series damping resistors may, for example be 2.7 kΩ.

An alternative means of damping the transmit windings, is to impregnate or coat the insulated winding conductors using resistive material with sufficient conductivity to provide damping, such as, for example, aquadag or conductive paint. This generally damps all orders of resonance including the fundamental. However, this also acts to substantially increase inter-winding capacitances, and thus the self-resonance of any winding coated or impregnated thus, whether it be a transmit or receive winding, is substantially reduced. If the aggregate transmit winding is driven by low impedance electronics, this is of no consequence other than a (small) increase in transmitter power consumption, but if the transmit winding also acts as a receive winding, or, if a receive winding is coated with conductive material, the resulting extra capacitance will increase the critically damped response decay period of the said windings acting to receive in response to the transmitted field, assuming critical damping is applied to the said windings during receive periods. Hence such a conductive coating acts detrimentally to the metal detector's performance to detect short time-constant metal targets. Nevertheless, there is an advantage of coating transmit windings with conductive material that are driven by low impedance transmit electronics.

Figure 10:
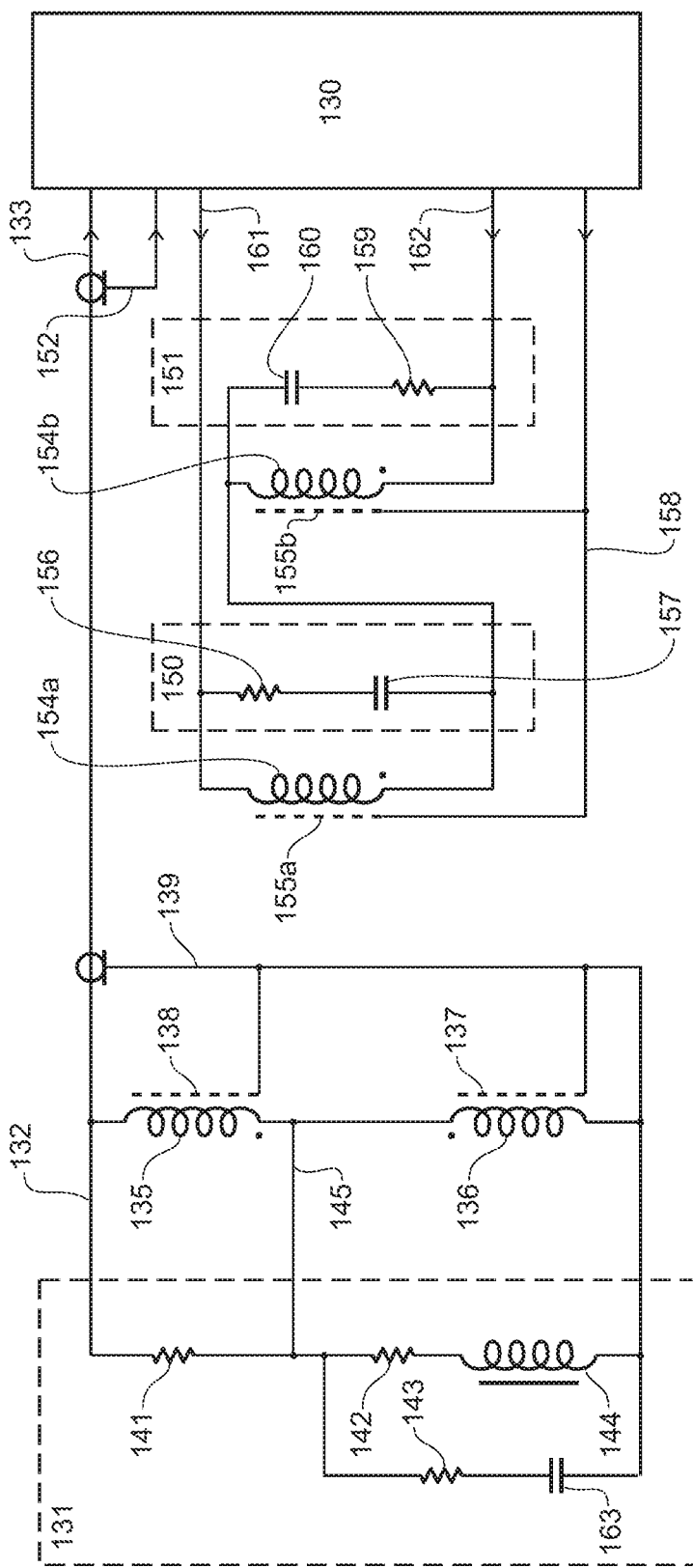
FIG. 10 depicts an exemplary circuit of the present invention.

With reference to FIG. 10, the induced signal in different windings of the aggregate receive windings from the transmitted magnetic field of the transmit winding's higher order resonances greater than the first, such as for example, induced in a first receive winding 135 and induced in a second receive winding 136 in series with first receive winding 135, are manifest differently in terms of magnitudes and phase shift in each winding. Further, a high rate of change of voltage transient applied to the transmit winding, induces higher-order resonances independently in each receive winding that are each different to each other and different to those generated in the transmit winding in terms of frequencies and magnitudes. Hence in total there may be several different second-order resonant frequencies and several different third-order resonant ringing frequencies generated simultaneously within the severally different transit and receive windings. The frequency and phase shifts of each of these is modulated by the permeability and permittivity of interrogated soils, and as stated above, may cause spurious signals when demodulated. Thus, these decaying ringing resonances should be damped with the aid of resistive damping, so that their roles are reduced during receive demodulation. Receive winding damping networks 131 could be housed within the coil housings to reduce these troublesome higher order resonances at their received source, but, for example, some damping components may also be included in a coil connector that may be plugged into the metal detector electronics. The receive windings are fed to a coaxial cable 132, 133, 139, 152 that feeds the metal detector electronics 130. Such damping networks 131 across such receive series windings may require different sorts of complex loads to reasonably effectively reduce the effects of these different induced higher order resonances within different receive windings connected in series, especially those from receive windings tightly mutually coupled to ringing transmit windings (that are thus more susceptible to both magnetic and electrostatic couplings to the transmit windings). Two such example damping networks are shown in FIG. 10, one of which, for example, may consist of a single resistor 141 connected in parallel with the first receive winding 135, and the other, a network across the second receive winding 136 may, for example, be a resistor 143 in series with capacitor 163 connected in parallel with an inductor 144 that is connected in series with a resistor 142. Another example could consist of a series "LCR" network with the "LC" resonance set near to a troublesome high-order resonance frequency. These damping networks could also act to some degree to damp the fundamental resonances too.

FIG. 10 also illustrates an example method of connecting the ES screens. A first electrostatic screen 138 acts locally to screen the first receive winding 135 from external electrical field EMI, and, an electrostatic screen 137 acts locally to screen the second receive winding 136 from external electrical field EMI. The electrostatic screens 137 and 138 are both connected to a coaxial cable shield 139, 152. This coaxial cable shield 139, 152 is connected to the electronics and the net signal of the series windings is connected to the shielded internal cable 132, 133, that in turn is connected to an input of the receive electronics within the metal detector electronics 130. A transmit signal cable 161 is connected to a first transmit winding 154a, and another transmit signal cable 162 is connected to a second transmit winding 154b. These transmit windings are connected in series. Each of the transmit windings, the first transmit winding 154a and the second transmit winding 154b, has an example of damping to increase high-order resonance damping, consisting of a resistor 156 in series with a capacitor 157, and, a resistor 159 in series with a capacitor 160, respectively. An ES screen 155a acting locally to screen electrical fields generated in the first transmit winding 154a and/or 154b from irradiating out of the coil housing, and an ES screen 155b acting locally to screen electrical fields generated in the second transmit winding 154b and/or first transmit winding 154a from irradiating out of the coil housing, are connected to the metal detector electronics 130. The ES screen 155a and the ES screen 155b may be the same screen. This ES screen connection 158 to the metal detector electronics 130, is fed separately to that of the ES screens 137 and 138, so that capacitive coupling between the transmit windings and their respective local ES screens (155a and 155b), does not contaminate signals associated with the ES screens (137 and 138) associated with the receive windings (135 and 136), with capacitively induced signals from the higher-order transmit winding resonances, i.e. order greater than 1, and/or, transmit signal electric field transients. In a more general sense, the coil housing includes a first electrostatic screen and a second electrostatic screen, wherein the first electrostatic screen acts more to screen the aggregate receive windings than transmit windings, and a coupling capacitance between the first electrostatic screen and aggregate receive windings is higher than that between the first electrostatic screen and aggregate transmit windings. The second electrostatic screen acts more to screen the aggregate transmit windings than aggregate receive windings, and a coupling capacitance between the second electrostatic screen and aggregate transmit windings is higher than that between the second electrostatic screen and aggregate receive windings. Each of the first electrostatic screen and second electrostatic screen are connected to the metal detector electronics 130 via different conductors, a first conductor and a second conductor respectively. The values of the components for the receive coils are dependent on numerous factors, such as, for example, the geometry of a winding, conductor parameters such as conductor thickness, insulation thickness and permittivity, the type and magnitude of the coupling between various transmit and receive windings (if applicable), the coaxial cable length and capacitance per unit length, filtering in the metal detector preamp, whether the receive electronics has aids to speed up the receive signal decay, to what extent the designer wishes to diminish the negative effects of the higher order resonances on detector performance and so on. With reference to FIG. 10 for example, suppose the first receive winding 135 and second receive winding 136 have moderate mutual couplings and connected in an out-of-phase-sense, and the first receive winding 135 has an inductance a bit less than 300 µH, and is moderately coupled to the transmit winding, and the second receive winding 136 has an inductance between say 50 and 100 µH and is tightly mutually coupled to the aggregate transmit winding, then an example value for resistor 141 could be in the vicinity of between say 5 and 10 kΩ, and resistor 142 could be in the vicinity of about 1 kΩ, resistor 143 could be between about 1 and 2 kΩ, inductance 144 could be in the vicinity of about 10 µH, and capacitor 163 could be in the vicinity of about 50 to 100 pF. Alternatively, an LCR network with an "LC" resonance near to a third-order resonance (a bit below 10 MHz for example, with "L" set at a few 10 s of µH), and an "R" value in the low hundreds of Ohms, may be added across a winding or windings of an aggregate receive winding, or, for example housed within the cable connector across the receive coaxial cable.

Figure 11:
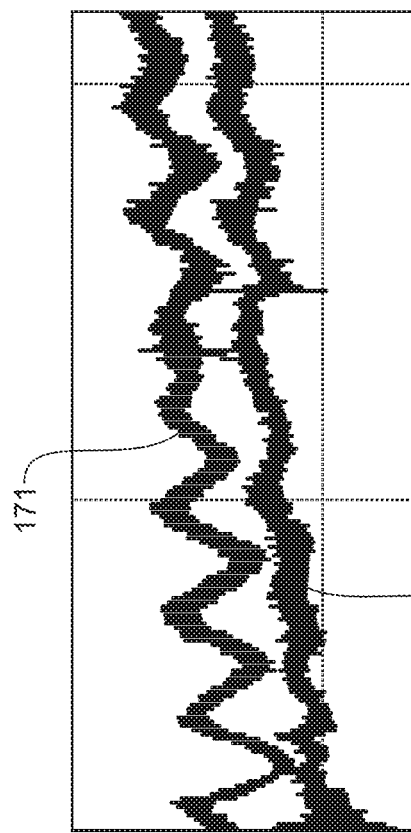
FIG. 11 compares received signals from a nulled coil with and without the present invention.

FIG. 11 shows oscilloscope traces of the received signal from a nulled coil, approximately when receive demodulation commences in a metal detector. The trace 171 (ringing frequency about 8 to 9 MHz) is for a coil with the second-order resonance of the transmit windings damped as described above, but with the receive windings merely having single resistor damping per winding without any reactive components, whereas the trace 173 comprises both resistive and reactive components within the passive damping networks of the receive windings as described above.

Figure 12:
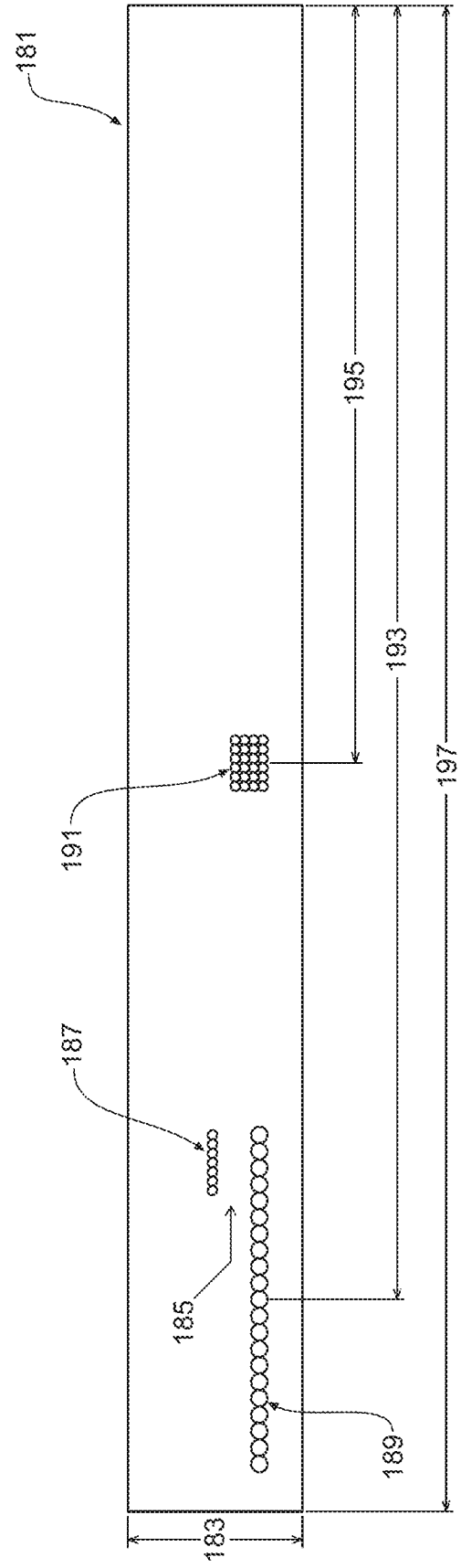
FIG. 12 depicts an exemplary coil of the present invention.

FIG. 12 depicts an exemplary coil 181. Half of the coil is shown with the right most boundary being a symmetrical centre axis of the coil. In this example, there is a transmit winding 189 with an aggregate receive winding comprising a first receive winding 187 and second receive winding 191 connected in series and in phase opposition so that they are nulled to each other, and there is a close gap 185 between the transmit winding 189 and the first receive winding 187. In this example, the coil is approximately 17 inches in diameter (i.e. coil radius 197=215 mm), thickness 183=25 mm, inner edge of the transmit winding 189 from the centre axis=163 mm, outer edge of the transmit winding 189 from the centre axis=206 mm, radius of the second receive winding 195=108 mm, inductance of transmit winding 189=290 µH, inductance of the first receive winding 187=46 µH, inductance of the second receive winding 191=296 µH. The passive network containing at least a resistive component may be connected across one or each of the first receive winding 187 or second receive windings 191. Such a passive network containing at least a resistive component includes just a resistor or both reactive and resistive components.

Figure 13:
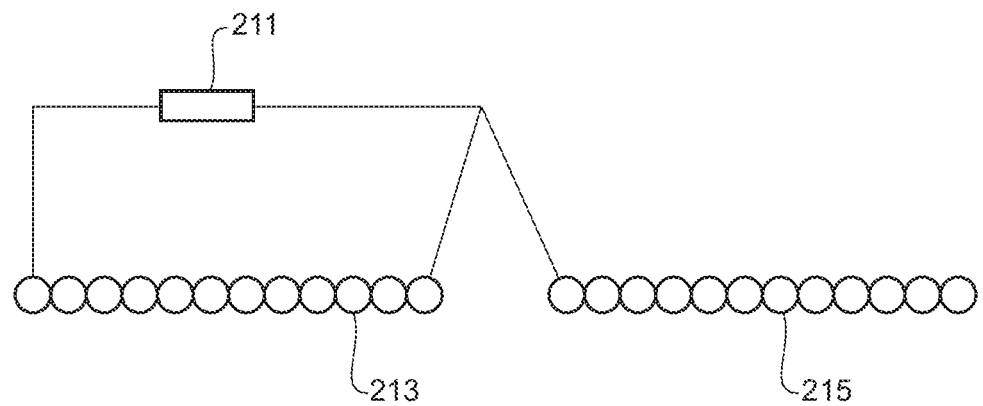
FIGS. 13 and 14 depict other embodiments of the present invention.

FIG. 13 depicts an embodiment alternative to the centre-tapped monolayer. This includes a gap at the "centre tap", and the split winding is joined in series "in the middle". The left and right of the cross-sectional conductors represent the ends of the composite winding, which includes two separated windings 213, 215, each with 10 turns. The windings 213, 215 are connected in series. The split windings 213, 215 are fairly tightly mutually coupled. The passive network containing at least a resistive component 211 connected across one half of the composite split winding 213, 215 may contain just a resistor or both reactive and resistive components, such as a resistor in series with a capacitor. This passive network containing at least a resistive component 211 acts to damp at least second order resonances of the composite winding 213, 215.

Figure 14:
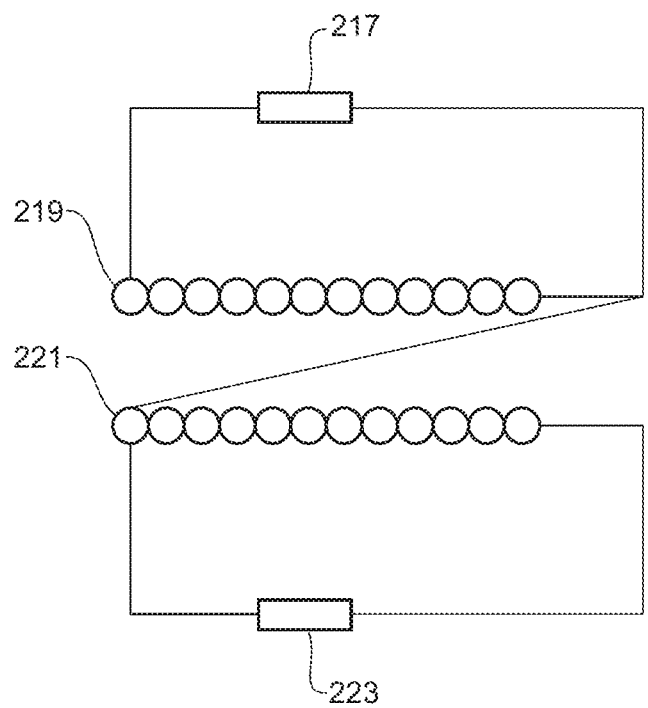

FIG. 14 depicts yet another embodiment of a composite transmit winding, also with a gap between each of the split windings, but as shown, the two windings 219, 221, each with 10 turns, are parallel and directly adjacent each other, and that the two windings 219, 221 are connected in series. The mutual coupling coefficient between these split windings 219, 221 is relatively high. As in FIG. 13, passive networks containing at least resistive components 223 and 217 act to damp at least the second order resonances of the composite winding 219, 221.

Those of skill in the art would understand that information and signals may be represented using any of a variety of technologies and techniques. For example, data, instructions, commands, information, signals, bits, symbols, and chips referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgment of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A winding of an antenna of a metal detector, the winding comprises multi-turn wire with both ends connected to the metal detector; and at least one resistive component for connecting a first part of the winding to a second part of the winding, wherein the first part or the second part are not both ends of the winding; and wherein the resistive component is configured to damp an internal resonance of the winding with an order greater than 1; and
   wherein the first part of the winding and the second past of the winding are tightly mutually coupled such that the first part of the winding and the second part of the winding act approximately as a single winding in terms of a fundamental resonance and higher-order resonances.

2. The winding of claim 1, wherein the resistive component comprises a resistor in series with a capacitive component or inductive component.

3. The winding of claim 1, wherein the first part and the second part are positioned in one of the following configurations:
   a) the first part or the second part is at one of the both ends connected to the metal detector; with the other part not at any of the both ends;
   b) both the first part and second part are not at any of the both ends.

4. The winding of claim 1, wherein a cross section of the multi-turn wire defines two ends wherein one of the two ends is at or near an outermost portion from a middle point of the antenna, and the other end is at or near an innermost portion from the middle point; and wherein a middle tap is positioned at a middle or near middle of the two ends of the winding, and the resistive component connects one of the two ends to the middle tap to reduce a Q factor of the second-order resonance.

5. The winding of claim 4, further comprising a quarter tap and a three-quarter tap at approximately a quarter and three-quarter distance of the cross sectional of the multi-turn wire for connecting the first part to the second part.

6. The winding of claim 1, wherein the resistive component is provided by a coat of conductive resistive damping material.

7. An antenna of a metal detector, comprising the winding of claim 1 as a first transmit winding, further comprising a second transmit winding, and the first transmit winding and the second transit winding are connected in series, and the at least one resistive component is connected in parallel with the first winding or the second winding.

8. The antenna of claim 7, wherein the first transmit winding, and the second transmit winding are tightly mutually coupled with a coupling constant $k_{12}$ of at least 0.8.

9. The antenna of claim 8, wherein there is a gap between the first transmit winding, and the second transmit winding.

10. The antenna of claim 7, wherein the first winding has at least part of its cross-sectional winding profile with a first cross-sectional axis longer than a second cross-sectional axis by at least a factor of 3.

11. The antenna of claim 7, wherein the first transmit winding, the second transmit winding, or both, is a monolayer winding.

12. The antenna of claim 7, wherein $$\sum_{all\ receive\ windings} \oiint \frac{\partial \overrightarrow{B_{uniform field}}}{\partial t} \cdot d\vec{s} \approx 0$$

such that an aggregate transmit winding and an aggregate receive winding consisting of all the receive windings, are approximately nulled when the coil is placed away from any material other than air.

13. An antenna of a metal detector comprising the winding of claim 1 as a first transmit winding, further comprising a receive winding, a first electrostatic screen and a second electrostatic screen, wherein the first electrostatic screen acts more to screen the receive winding than the transmit winding and a coupling capacitance between the first electrostatic screen and the receive winding is higher than that between the first electrostatic screen and transmit winding, and, the second electrostatic screen acts more to screen the transmit winding than the receive winding, and a coupling capacitance between the second electrostatic screen and the transmit winding is higher than that between the second electrostatic screen and the receive winding, and each of the first electrostatic screen and second electrostatic screen are connected to the metal detector electronics via different conductors, a first conductor and a second conductor, respectively.

14. The antenna of claim 13, wherein the first conductor is an external screen of a coaxial cable.

15. The antenna of claim 14, wherein an inner core cable of the coaxial cable is connected to the receive winding.

16. The winding of claim 1, wherein the winding is a winding of a receive coil of the metal detector, wherein the resistive component comprises a resistor in series with a capacitive component or inductive component for connecting a first part of the winding to a second part of the winding.

17. The winding of claim 1, wherein the winding is a winding of a receive coil of the metal detector nulled to a transmit coil of the metal detector; and wherein the resistive component is configured to damp high order resonances not nulled between the receive coil and the transmit coil.

18. The winding of claim 17, wherein the resistive component is further configured to damp high order resonances within the receive coil itself, concurrently with the damping of the high order resonances not nulled between the receive coil and the transmit coil.

19. The winding of claim 1, wherein the at least one resistive component comprises a resistor in series with a capacitor.

* * * * *